United States Patent [19]
Takano et al.

[11] Patent Number: 6,104,574
[45] Date of Patent: Aug. 15, 2000

[54] MAGNETIC HEAD WITH A MAGNETIC POLE SANDWICHED BETWEEN CONDUCTIVE MATERIALS

[75] Inventors: Hisashi Takano, Kodaira; Yohji Maruyama, Iruma; Makoto Aihara, Hitachinaka; Takashi Kawabe; Moriaki Fuyama, both of Hitachi, all of Japan

[73] Assignee: Hitachi, Ltd., Tokyo, Japan

[21] Appl. No.: 09/011,838

[22] PCT Filed: Aug. 23, 1995

[86] PCT No.: PCT/JP95/01667

§ 371 Date: Feb. 20, 1998

§ 102(e) Date: Feb. 20, 1998

[87] PCT Pub. No.: WO97/08687

PCT Pub. Date: Mar. 6, 1997

[51] Int. Cl.$^7$ .................................. G11B 5/31; G11B 5/39
[52] U.S. Cl. ............................................. 360/126; 360/113
[58] Field of Search .................................. 360/113, 103, 360/119–126

[56] References Cited

U.S. PATENT DOCUMENTS

| | | | |
|---|---|---|---|
| 4,535,374 | 8/1985 | Anderson et al. | 360/103 |
| 4,611,259 | 9/1986 | Schiller | 360/125 |
| 4,933,785 | 6/1990 | Morehouse et al. | 360/78.04 |
| 5,231,549 | 7/1993 | Morehouse et al. | 360/105 |
| 5,237,472 | 8/1993 | Morehouse et al. | 360/105 |
| 5,289,325 | 2/1994 | Morehouse et al. | 360/105 |
| 5,331,728 | 7/1994 | Argyle et al. | 360/126 |
| 5,341,260 | 8/1994 | Jabbari | 360/105 |
| 5,394,281 | 2/1995 | Kajitani | 360/105 |
| 5,404,636 | 4/1995 | Stefansky et al. | 29/603.03 |
| 5,438,747 | 8/1995 | Krounbi et al. | 360/113 |
| 5,455,723 | 10/1995 | Boutaghou et al. | 360/105 |
| 5,469,314 | 11/1995 | Morehouse et al. | 360/105 |
| 5,486,964 | 1/1996 | Morehouse et al. | 360/105 |
| 5,675,460 | 10/1997 | Watanabe et al. | 360/125 |
| 5,774,308 | 6/1998 | Ohtsuka et al. | 360/126 |
| 5,777,824 | 7/1998 | Gray | 360/103 |
| 5,822,153 | 10/1998 | Lairson et al. | 360/104 |

FOREIGN PATENT DOCUMENTS 62-43808  2/1987  Japan .

*Primary Examiner*—Jefferson Evans
*Attorney, Agent, or Firm*—Kenyon & Kenyon

[57] ABSTRACT

A leaking magnetic flux from a taper portion is canceled by utilizing an eddy current loss by using a magnetic head having a structure wherein at least a part of a magnetic pole constituting a magnetic path through a recording gap is sandwiched by conductive materials with respect to a track width direction, and a write blur quantity can be thus reduced. Further, magnetic saturation can be prevented by limiting a volume decrease at the distal end portion of the magnetic pole when the track width is reduced. Accordingly, the present invention can prevent magnetic saturation of the distal end portion of the magnetic pole resulting from the reduction of the width of the track of the recording head, can accomplish narrow-track recording by the recording head to a recording medium having high-coercive force and can reduce write blur. Further, the present invention can provide a narrow-track magnetic head capable of accomplishing a high-speed transfer, large-capacity magnetic recording system, and a magnetic memory apparatus using this magnetic head.

4 Claims, 8 Drawing Sheets

(a)

(b)

(c)

(d)

(e)

(a)

MAGNETIC HEAD WITH A MAGNETIC POLE SANDWICHED BETWEEN CONDUCTIVE MATERIALS

TECHNICAL FIELD

The present invention relates to a high-speed transfer, large-capacity magnetic recording method associated with a high-frequency recording operation, and in particular, to a narrow-track magnetic head and a magnetic memory apparatus using the head operating in accordance with the recording method.

BACKGROUND ART

An example in which a magnetic head is combined with a conductive film to improve performance of the head by use of an eddy current flowing through the conductive film has been described, for example, in "Minimization of Inductance of Head by Magnetic Shielding Effect" written in page 115 of the "17th Japan Applied Magnetic Engineering Society Proceedings". In the prior art, a surface of a ferrite head core for a VTR is covered with a non-magnetic conductive film. A magnetic flux which will leak through the film to an outside space of the head core is confined in the head core by the magnetic shielding effect due to an eddy current loss. This reduces the head inductance and hence improves efficiency of the core. In this example, surfaces of a coil and a core of the VTR ferrite head are covered with copper films to improve the head efficiency.

Additionally, an example in which an end portion of an upper magnetic pole has a reversely tapered contour when viewed from a side of a sliding surface has been described in "Dual Stripe Magnetoresistive Heads for High Density Recording" written in pages 303 to 308 of the "IEEE Transactions On Magnetics", Vol. 30, No. 2, March 1994. Since the recording head of the conventional example includes head poles manufactured through a plating procedure, the end portions are formed with a surface having a reversely tapered contour rather than an exactly vertical contour. However, peripherals of magnetic poles are sandwiched with regions of an insulating alumina protective layer.

FIG. 9 shows a conventional example related to the present invention. FIG. 9 includes an insulative layer (non-conductive film) 14.

It is an object of the present invention to provide a narrow-track magnetic head and a magnetic memory apparatus using a recording head in which magnetic saturation in the end portion of the pole due to minimization of track width of the recording head is prevented to thereby enable a narrow-track recording on a medium having a high coercive force and which implements a high-speed transfer, large-capacity magnetic recording method associated with a high-frequency recording operation with reduced write blur.

DISCLOSURE OF INVENTION

The object above is achieved by a magnetic head having features described below and a magnetic memory apparatus using the head.

A first feature of the present invention resides in (1) a magnetic head and a magnetic memory apparatus using the head in which at least a portion of poles constructing a magnetic path through a recording gap is sandwiched between conductive materials with respect to a track width direction.

In (1) above, it is favorable (2) that the conductive material has resistivity less than that of a material of the magnetic pole constituting the magnetic path. This is because the leakage magnetic field is canceled by the eddy current loss.

In (1) above, it is favorable (3) that the conductive material has resistivity equal to or less than 20 $\mu\Omega$-cm. This is because the write blur is minimized (reference is to be made to FIG. 4).

In (1) above, it is favorable (4) that those magnetic poles not sandwiched between the conductive materials among the plural magnetic poles forming the magnetic path of the head includes a step in a track width direction. This is because the write blur can be further minimized.

A second feature of the present invention resides in (5) a magnetic head and a magnetic memory apparatus using the head in which at least a portion of the plural magnetic poles configuring a magnetic path through a recording gap is sandwiched between conductive materials with respect to the track width direction and in which an expression Tww'$\geq$Tww is satisfied, where Tww is the width of the head on a contact surface related to the gap and Tww' is the width thereof on a surface opposite to the contact surface.

A third feature of the present invention resides in a magnetic head and a magnetic recording apparatus using the head in which at least a portion of the plural magnetic poles configuring a magnetic path through a recording gap is sandwiched between conductive materials with respect to the track width direction and in which the head has a track width of at least 2 $\mu$m such that a recording track written on a medium has a width equal to or more than the recording track width of the head.

BEST MODE FOR CARRYING OUT THE INVENTION (Embodiment 1)

Figure 1:
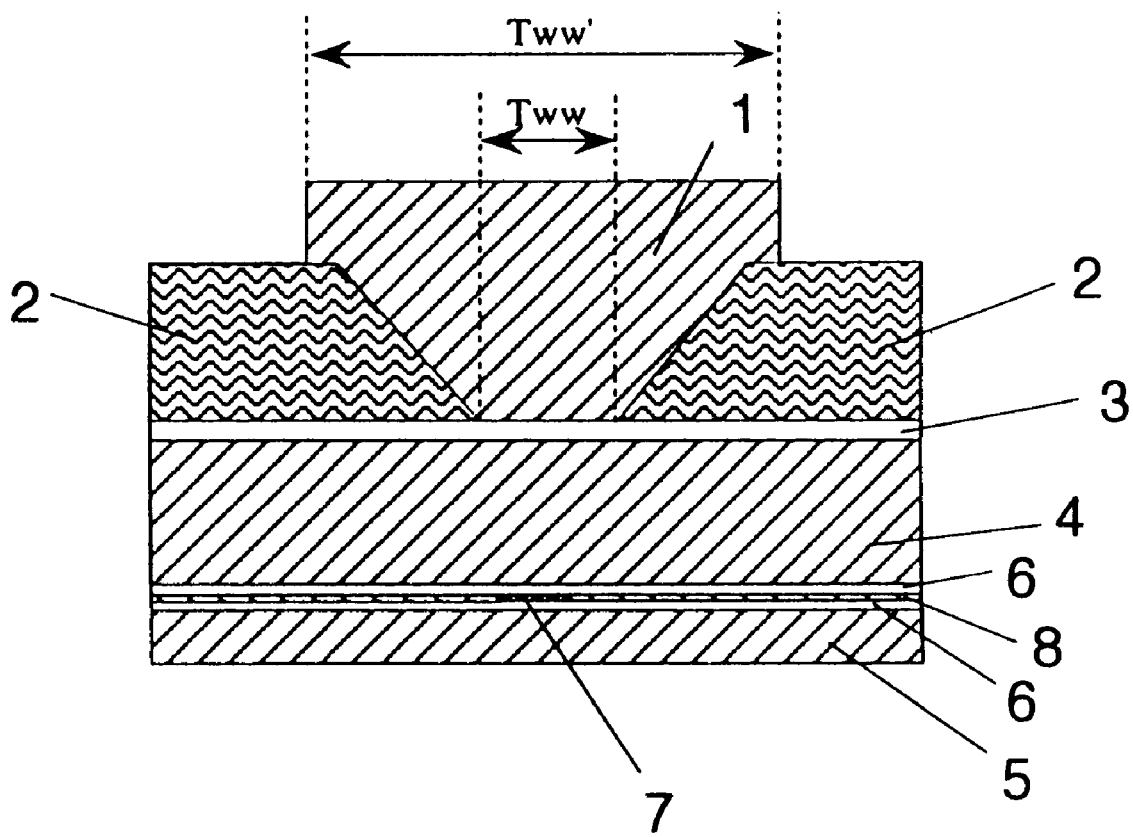
FIG. 1 is a diagram showing the configuration of a first embodiment of a magnetic head viewed from an air bearing surface side thereof in accordance with the present invention, FIGS. 2(a)–2(e) form a diagram for explaining a process of manufacturing the magnetic head in accordance with the present invention.

Referring now to the drawings, description will be given of an embodiment 1 of the present invention. First, FIG. 1 is a diagram showing the device configuration of an end portion of magnetic poles of an inductive magnetic head viewed from its air bearing surface side in accordance with the present invention. The head according to the invention is a head of a recording/reproducing separation type in which an inductive device is employed for the recording operation and a magnetoresistive effect device is used for the reproducing operation. An upper magnetic pole (1) of a recording pole has end portions configured in a reverse tapered contour such that a width (Tww) thereof on a contact surface related to a gap layer (3) is less than a width (Tww') thereof on a surface opposite to the contact surface. Incidentally, disposed on both sides of the upper magnetic pole (1) are portions of a conductive copper film (2). The upper magnetic pole (1) and a lower magnetic pole (4) of the recording head are formed with a magnetic substance, i.e. a film of Ni42Fe58 alloy having a resistivity of 45 $\mu\Omega$-cm, a saturation flux density of 1.7T (Tesla), and a thickness of 3 $\mu$m. The gap layer (3) is made of a layer of Al2O3 having a thickness of 0.4 $\mu$m. In this connection, the lower pole (4) also serves as a shielding layer for the reproducing head. On the other hand, a lower shielding layer (5) is a film of Ni19Fe81 alloy having a thickness of 2 $\mu$m. Between the lower shield layer (5) and the upper shield layer serving also as the lower pole (4), there is formed a magnetoresistive effect device (7) including a film of Ni19Fe81 alloy via a gap layer (6) made of Al2O3. On both ends of the device (7), there are fabricated lead lines (8) to apply a detection current to the device (7).

Figure 2:
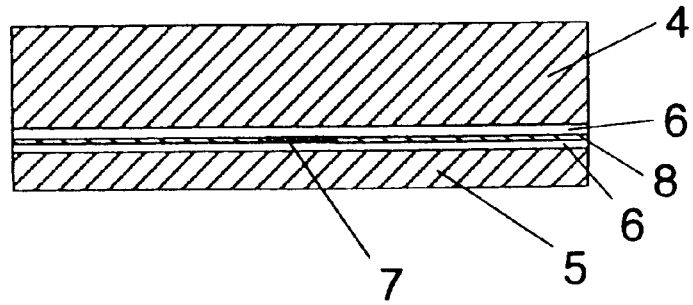
Figure 2:
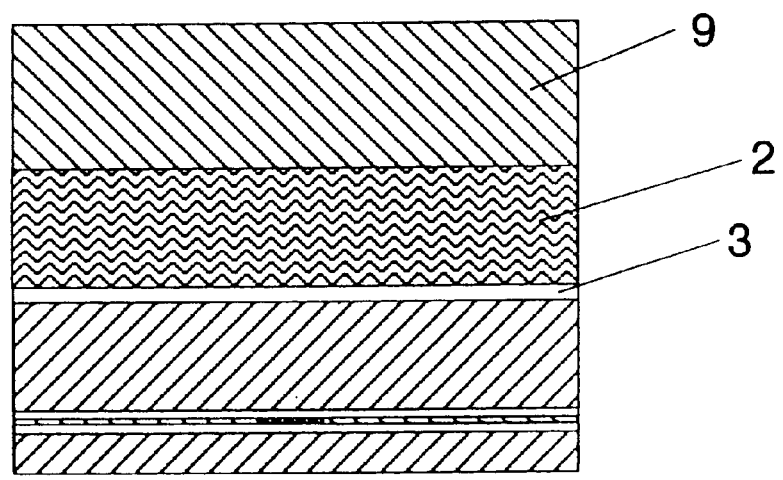
Figure 2:
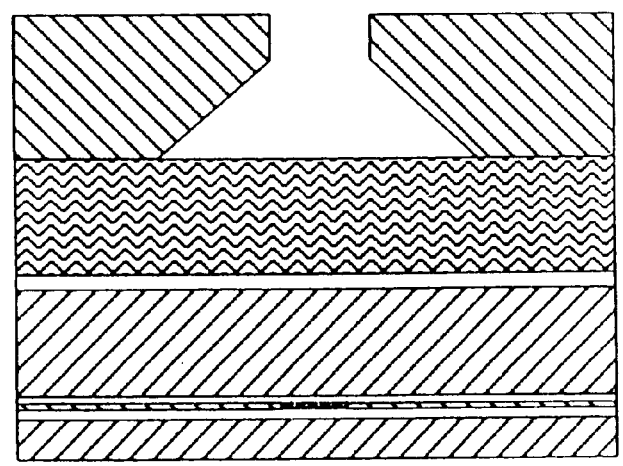
Figure 2:
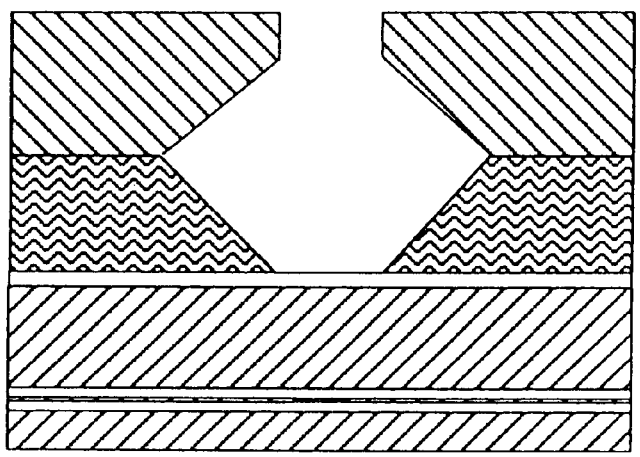
Figure 2:
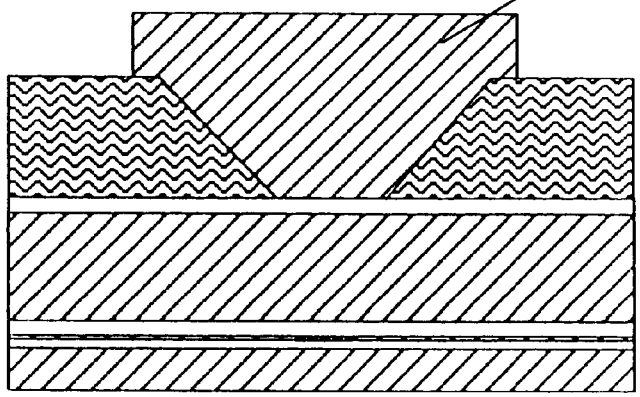

Sections (a) to (e) of FIG. 2 are diagrams for explaining a method of producing a magnetic head device in accordance with the present invention. In (a), a magnetoresistive effect head shielded on both sides is fabricated on a substrate through an ordinary process. In (b), an insulation film of Al2O3 (3) to be used as a recording gap is formed on an upper shield layer (4), a conductive copper film (2) is sputtered thereon, and then a resist layer (9) including a deep UV resin is spin-coated on the insulation layer (3). In (c), the resist film (9) is exposed and is thereafter etched to obtain a reverse tapered contour. In (d), a portion of the copper film is removed through an ion milling process. In (e), after removing the resist pattern (9), an upper magnetic pole (1) is manufactured through a sputtering step and unnecessary portions are removed by a milling process to thereby finish the device producing process. Although the upper magnetic pole is formed through sputtering and milling processes in this embodiment, it is also possible to use a plating process to fabricate the upper magnetic pole. In addition, while the reproducing device includes an ordinary magnetoresistive effect device including a permalloy, there may be employed a spin valve device having a high reproducing sensitivity or a big magentoresistive effect device.

Figure 3:
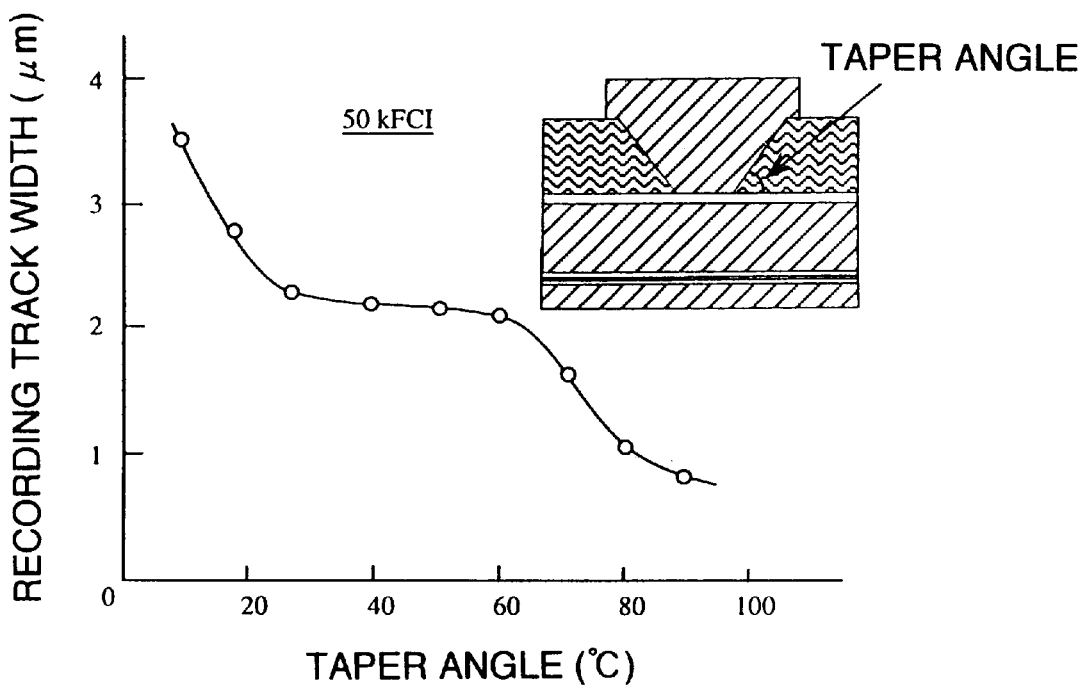
FIG. 3 is a graph for explaining a recording characteristic of the magnetic head in accordance with the present invention.

Subsequently, description will be given of effect of the present invention attained by investigating relationships between the recording characteristic, the head contour, and the configuration of the magnetic head in accordance with the present invention. FIG. 3 first shows results of investigation of a relationship between the taper angle between both ends of the upper magnetic pole and the width of the recording track recorded on a medium. In this case, the taper angle is defined as an angle between a recording gap surface and the end portion of the upper magnetic pole. The media used for the reproduction of records is made of CoCrPt having a coercive force of 3 kOe and the floating distance of the head is set to 40 nm in the recording operation. The number of head coil windings is 17 and the recording current is 30 mAop. The track width of the upper magnetic pole is 2 $\mu$m on the gap surface. Disposed on each end of the pole is a copper film having a resistivity of 3 $\mu\Omega$-cm. The material of magnetic poles, film thicknesses, and the gap length are the same as those shown in FIG. 1. In the recording operation, the head speed relative to the medium is fixed to 50.8 m/s such that 50 kFCI signals are written thereon with a recording frequency of 50 MHz. It can be seen from the results of FIG. 3 that when the taper angle exceeds 60°, the end portion of the magnetic pole is saturated and the recording operation cannot be satisfactorily carried out on the medium and the track width is reduced. On the other hand, when the taper angle becomes equal to or less than 30°, the amount of write blur gradually increases. This resultantly indicates that a desired track width can be used in the write operation when the taper angle of the both ends of the magnetic pole is set to a range from 30° to 60°.

Figure 4:
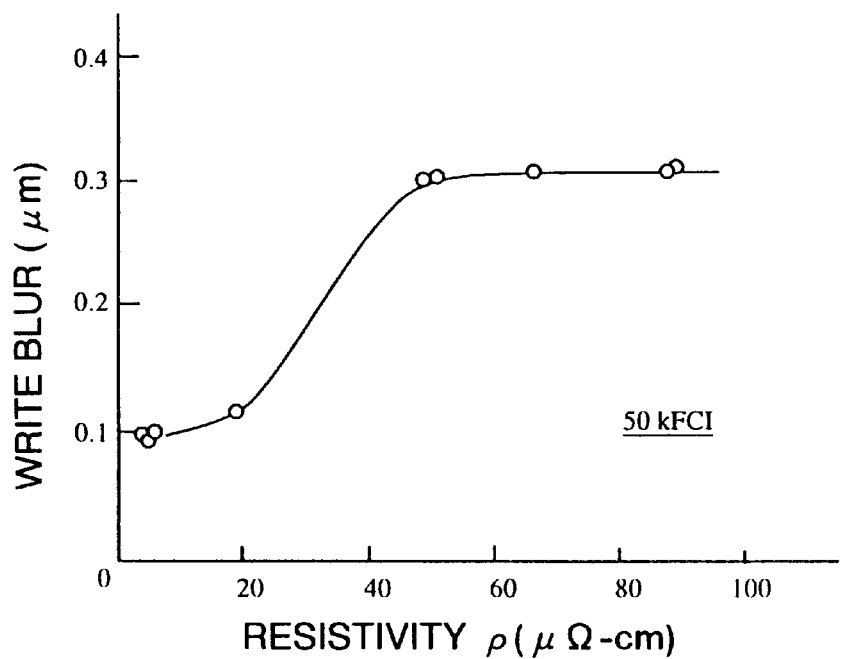
FIG. 4 is a graph for explaining a recording characteristic of the magnetic head in accordance with the present invention.

FIG. 4 shows results of measurement of a change in the amount of write blur when the resistivity of the conductive layer of both ends of the upper magnetic pole is altered. In this embodiment, the used conductive layers are a copper film with a resistivity of 3 $\mu\Omega$-cm, a tungsten film with a resistivity of 5 $\mu\Omega$-cm, a tantalum film with a resistivity of 20 $\mu\Omega$-cm, a zirconium film with a resistivity of 50 $\mu\Omega$-cm, and a NiCr film with a resistivity of 90 $\mu\Omega$-cm. The taper angle at the both ends of the upper pole is set to 60° and the recording track width is 2 $\mu$m. The recording condition is the same as that shown in FIG. 3. It can be seen from the results of FIG. 4 that the amount of write blur can be minimized to 0.1 $\mu$m or less when the resistivity is set to 20 $\mu\Omega$-cm or less.

Figure 5:
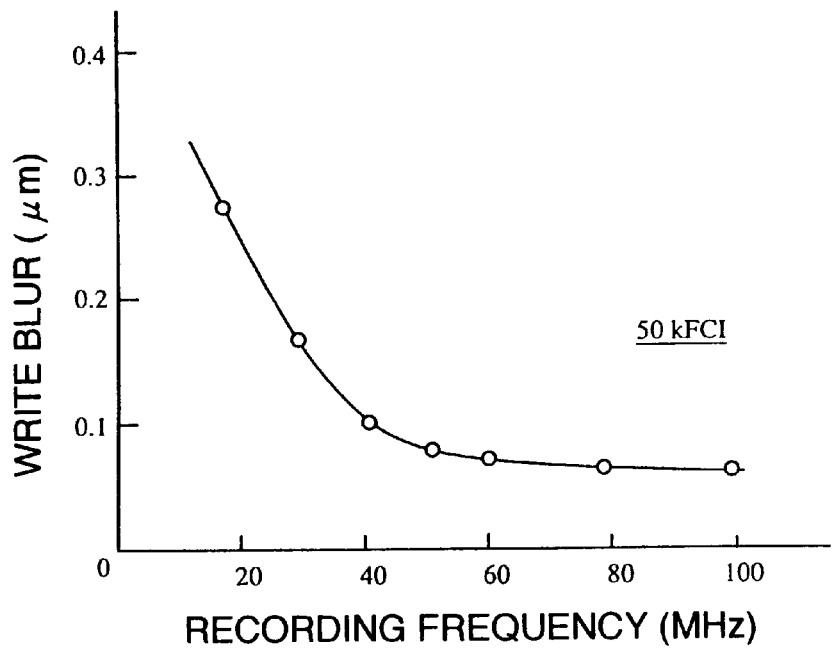
FIG. 5 is a graph for explaining a recording characteristic of the magnetic head in accordance with the present invention.

Next, description will be given of an effect of the present invention. FIG. 5 shows results of measurement of a relationship between the amount of write blur and the recording frequency when signals having a line recording density of 50 kFCI are written by a magnetic head in accordance with the present invention on a medium by changing the recording frequency. In this case, the amount of write blur is defined by a value obtained by subtracting the track width of the recording head from that written on the medium. The head speed relative to the medium is set such that the line recording density is kept unchanged even when the recording frequency is changed. In the magnetic head used for the measurement, the taper angle of the upper magnetic pole is set to 60° and a copper film with a resistivity of 2 $\mu\Omega$-cm is employed on both end portions of the recording magnetic pole. Results of FIG. 5 indicate that when the recording frequency is set to 50 MHz or more in the magnetic head of the present invention, the amount of write blur can be reduced to 0.1 $\mu$m or less.

Figure 6:
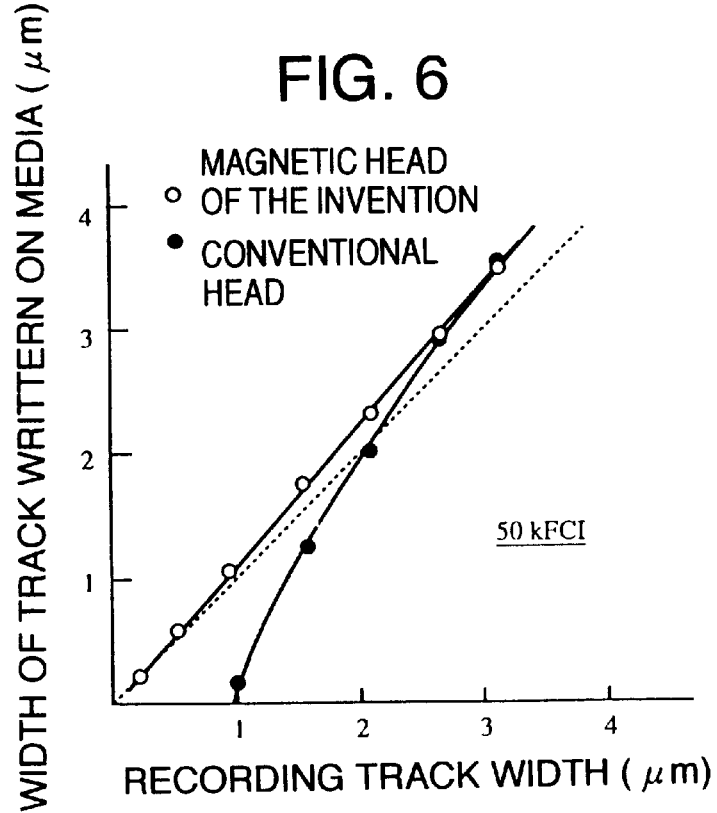
FIG. 6 is a graph for explaining an effect of the present invention.

Finally, description will be given of results of measurements of a relationship between the recording track width and the width of the track written on the medium by use of trial products of magnetic heads having different recording track widths. In FIG. 6, the recording characteristic of the recording head in accordance with the present invention is compared with that of a recording head which does not include the conductive films on both end portions of the upper magnetic pole and in which the taper angle on both end portions of the head is about 90°. In both heads, a 3 $\mu$m thick Ni42Fe58 film with a resistivity of 45 $\mu\Omega$-cm is used for the upper and lower magnetic pole and the gap length is 0.4 $\mu$m. The medium adopted for the measurement is made of CoCrPt with a coercive force of 3 kOe and the head speed relative to the medium is set to 50.8 m/s to write signals of a line recording density of 50 kFCI with a recording frequency of 50 MHz. Incidentally, the head floating distance is set to 40 nm for both heads in the recording operation. It can be seen from results of FIG. 6 that when the track width is 2 $\mu$m or less in the conventional recording head, the recording track width on the medium becomes less than the recording track width of the head. Moreover, when the track width is 1 $\mu$m or less, the recording operation is impossible. On the other hand, in accordance with the recording head of the present invention, even when the recording track width is reduced to 0.3 µm, there is formed a recording track having a width equal to the recording track width.
(Embodiment 2)

Figure 7:
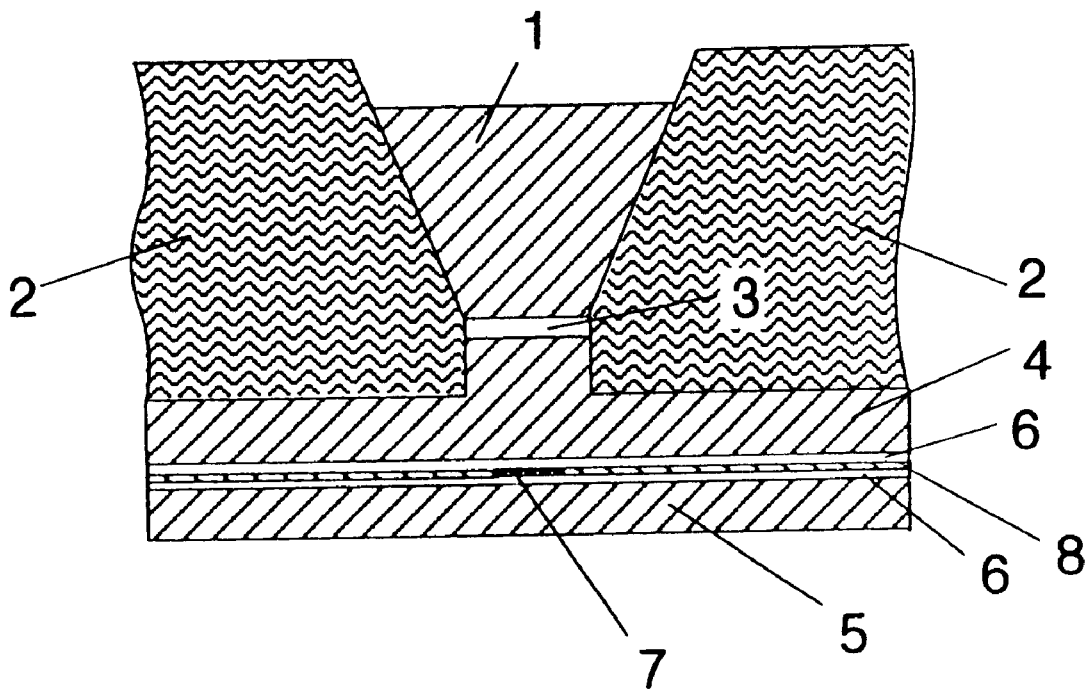
FIG. 7 is a diagram showing the configuration of a second embodiment a magnetic head viewed from an air bearing surface side thereof in accordance with the present invention.

FIG. 7 shows another structure of the head in accordance with the present invention. In the head of this constitution, a portion of the lower magnetic pole is also milled to have a width equal to that of the associated portion of the upper magnetic pole. This makes it possible to much more reduce the amount of write blur.

The configuration of FIG. 7 of the present invention is substantially identical to that of FIG. 1. That is, also in FIG. 7, the head is a head of the recording/reproducing separation type in which an inductive device is employed for the recording operation and a magnetoresistive effect device is used for the reproducing operation. In the recording magnetic pole unit, both end portions of the upper magnetic pole (1) are shaped in a reverse tapered contour such that the contact surface thereof related to the gap layer (3) is smaller in width than a surface thereof opposing to the contact surface.

In this regard, the other conditions are completely same as those of the case of embodiment 1.

When compared with the method of fabricating the magnetic head device section shown in (a) to (e) of FIG. 2, this embodiment differs from embodiment 1 only in that not only a portion of the copper film is removed by the ion milling operation in process (d). Namely, portions respectively of the copper film, the recording gap, and the upper shield are removed.

Table 1 shows an example of specifications of a magnetic memory apparatus including a magnetic head in accordance with the present invention. In the magnetic memory apparatuses associated with embodiments 1 and 2, there are used three magnetic disks with a diameter of 3.5 inches to implement a format capacity of 12 GB.

Additionally, the apparatus includes a magnetic head with a track width of 1.5 µm in accordance with the present invention and the recording frequency is set to a range from 69.5 MHz to 111.2 MHz.

Table 1 Specifications of magnetic memory apparatus including magnetic head in accordance with the present invention

| Disk diameter | 3.5 inches |
| --- | --- |
| No. disks | 3 |
| Format capacity | 12 GB |
| Max. line recording density | 200 KBPI |
| Track density | 20 KTPI |
| Rotation speed | 7200 rpm |
| Transfer speed | 15.4 to 24.7 MB/s |
| Recording frequency | 69.5 to 111.2 MHz |
| Recording track width | 1.5 µm |
| Reproducing track width | 1.0 µm |

Figure 8:
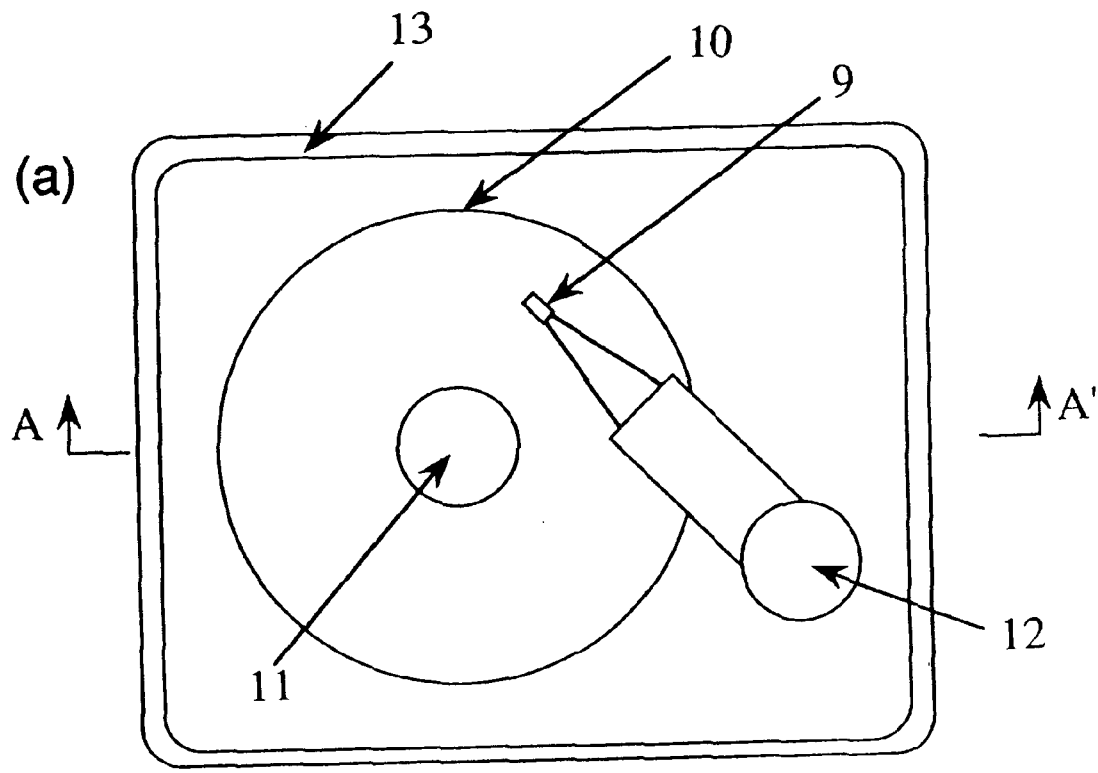
FIG. 8 is a diagram showing an outline of a magnetic memory apparatus (magnetic disk unit) of the present invention using a magnetic head in accordance with the present invention.
Figure 8:
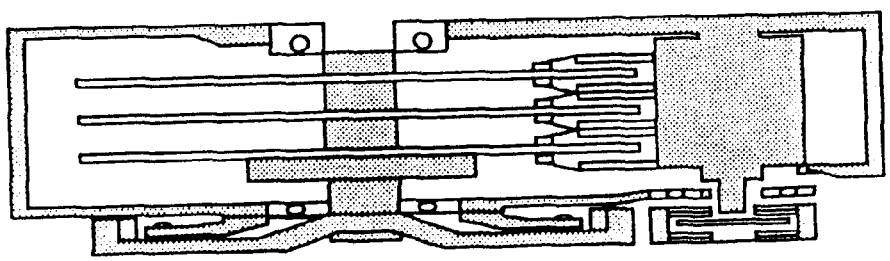
Figure 9:
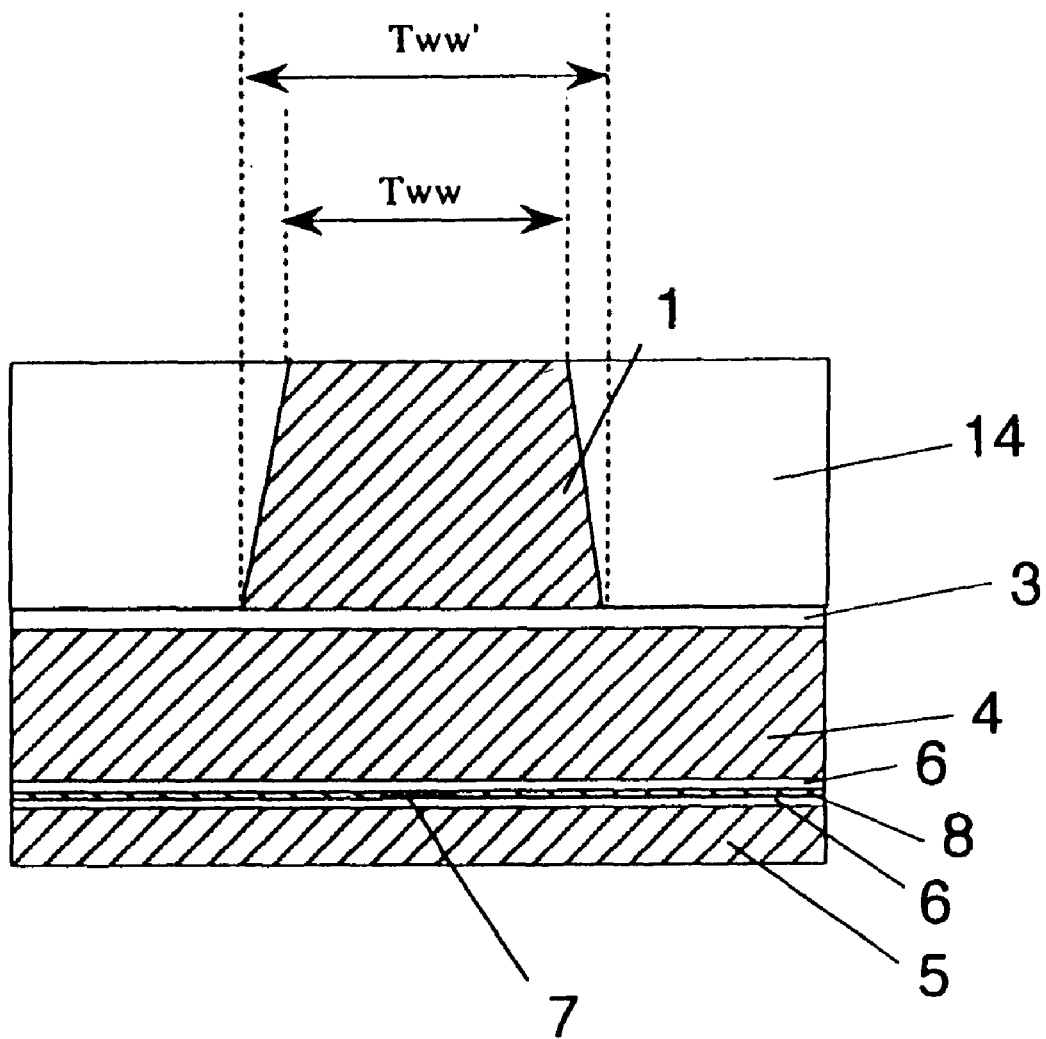
FIG. 9 is a diagram showing a conventional example of the magnetic head related to the present invention.

FIG. 8 shows a general configuration of a magnetic memory apparatus (magnetic disk unit) using a magnetic head in accordance with the present invention. FIG. 8 includes a magnetic head 9, a magnetic disk 10, a spindle 11, an actuator 12, and a housing 13.

Thanks to the present invention, there can be provided a magnetic head which has a large capacity and which is suitable for a high-speed transfer operation and a magnetic memory apparatus using the same.

INDUSTRIAL APPLICABILITY

Of a pair of magnetic films configuring magnetic poles, at least one of the films are fabricated such that both ends thereof have a reversely tapered contour. Consequently, when the track width is minimized, the minimization in volume of the end portions of magnetic poles can be minimized to thereby prevent magnetic saturation. Furthermore, on both sides of the magnetic pole having the reversely tapered end portions, there are disposed a material having low resistivity. Therefore, the leakage magnetic field from the tapered portions can be canceled by the eddy current loss to thereby minimize the amount of write blur.

Consequently, the present invention is suitably applicable to a magnetic head and/or a magnetic memory apparatus implementing a high-speed transfer, large-capacity magnetic recording method related to a high-frequency recording operation in which there is prevented magnetic saturation in the end portions of magnetic poles due to the minimization of track width of the magnetic head such that a narrow-track recording operation is conducted on a medium having a high coercive force and write blur is minimized.

We claim:

1. A magnetic head, including at least a lower magnetic pole, a gap layer and an upper magnetic pole formed in order, wherein at least a portion of the upper magnetic pole, forming a magnetic path through a recording gap, is sandwiched between conductive materials with respect to a track width direction and the expression Tww'>Tww is satisfied, where Tww is a width of the upper magnetic pole on a contact surface related to the gap layer when viewed from a medium opposing surface and Tww' is a width thereof on a surface to the contact surface.

2. A magnetic head in accordance with claim 1, wherein the conductive material has a resistivity less than a resistivity of a material forming the magnetic path.

3. A magnetic head in accordance with claim 1, wherein the conductive material has a resistivity of 20 µΩ-cm or less.

4. A magnetic head in accordance with claim 1, wherein of two magnetic poles forming the magnetic path of the magnetic head, the magnetic pole not sandwiched between the conductive materials includes a step in a track width direction.

* * * * *